US011290941B2

(12) United States Patent
Bartell

(10) Patent No.: US 11,290,941 B2
(45) Date of Patent: Mar. 29, 2022

(54) SELECTIVELY USING A CO-PROCESSOR TO PROCESS NETWORK ROUTING INFORMATION IN A FIFTH GENERATION (5G) OR OTHER NEXT GENERATION NETWORK

(71) Applicant: AT&T Intellectual Property I, L.P., Atlanta, GA (US)

(72) Inventor: John Barry Bartell, Alpharetta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 9 days.

(21) Appl. No.: 16/804,521

(22) Filed: Feb. 28, 2020

(65) Prior Publication Data

US 2021/0274424 A1 Sep. 2, 2021

(51) Int. Cl.
| H04W 40/24 | (2009.01) |
| H04L 45/00 | (2022.01) |
| H04L 45/745 | (2022.01) |
| H04W 24/06 | (2009.01) |
| H04L 45/02 | (2022.01) |

(52) U.S. Cl.
CPC ........... H04W 40/248 (2013.01); H04L 45/02 (2013.01); H04L 45/54 (2013.01); H04L 45/745 (2013.01); H04W 24/06 (2013.01)

(58) Field of Classification Search
None
See application file for complete search history.

(56) References Cited

U.S. PATENT DOCUMENTS

2004/0001497 A1\* 1/2004 Sharma ................... H04L 45/48
                                                                    370/401
2013/0265881 A1\* 10/2013 Filsfils .................... H04L 43/00
                                                                    370/241

FOREIGN PATENT DOCUMENTS

EP          3226492 A1 \* 10/2017  ........... H04L 45/021

OTHER PUBLICATIONS

Bartell "Selectively Rerouting Network Traffic in a Fifth Generation (5G) or Other Next Generation Network" U.S. Appl. No. 16/793,283, filed Feb. 18, 2020, 48 pages.

(Continued)

*Primary Examiner* — Anh Ngoc M Nguyen
(74) *Attorney, Agent, or Firm* — Amin, Turocy & Watson, LLP

(57) ABSTRACT

The technologies described herein are generally directed toward establishing a domain of authority for routing table updates from a routing device. For instance, operations can comprise facilitating receiving, from a second routing device via a network, a route update for the routing table of the first routing device, wherein the route update is associated with a first network route. An additional operation can evaluate a value of the route update, resulting in an evaluated value of the route update. Further an operation can include updating, by the graphics processing unit, a first entry of the routing table based on the route update and the evaluated value of the route update, wherein evaluating the value of route updates, comprising the evaluating the value, and updating entries of the routing table, comprising the updating the first entry, are comprised in an updating process.

20 Claims, 10 Drawing Sheets

(56) References Cited

OTHER PUBLICATIONS

Bartell, "Selectively Shedding Processing Loads Associated With Updates To a Routing Table in a Fifth Generation (5G) or Other Next Generation Network", U.S. Appl. No. 16/793,508, filed Feb. 18, 2020, 50 pages.

Bartell, et al. "Selectively Bypassing a Routing Queue in a Routing Device in a Fifth Generation (5G) or Other Next Generation Network", U.S. Appl. No. 16/794,534, filed Feb. 19, 2020, 46 pages.

Bartell "Selectively Sending Routing Information To Routing Devices in a Fifth Generation (5G) or Other Next Generation Network" U.S. Appl. No. 16/804,429, filed Feb. 28, 2020, 43 pages.

Bartell, et al. "Establishing Domains of Authority for Routing Table Updates Between Routing Devices in a Fifth Generation (5G) or Other Next Generation Network", U.S. Appl. No. 16/804,568, filed Feb. 28, 2020, 55 pages.

* cited by examiner

SELECTIVELY USING A CO-PROCESSOR TO PROCESS NETWORK ROUTING INFORMATION IN A FIFTH GENERATION (5G) OR OTHER NEXT GENERATION NETWORK

TECHNICAL FIELD

The subject application is related to computer networking, and, for example, using a router to select network traffic routes in a fifth generation (5G) or other next generation network.

BACKGROUND

As networks continue to be expanded to handle larger amounts of information, the need for rapid and efficient routing within networks continues to increase. This is especially true when existing networks are used to carry larger traffic before hardware capabilities have been increased.

With traditional routing strategies, routing devices can receive routing information from other, different routing devices, with continual hardware upgrades matching increases in network use. With recent dramatic increases in demand for network bandwidth however, in some circumstances, even traditional hardware upgrades can be rendered ineffective. For example, in some circumstances, because of increases in network capacity requirements, the content, amount, and frequency of updates to routing information shared between routing devices can fail to sufficiently model network conditions.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
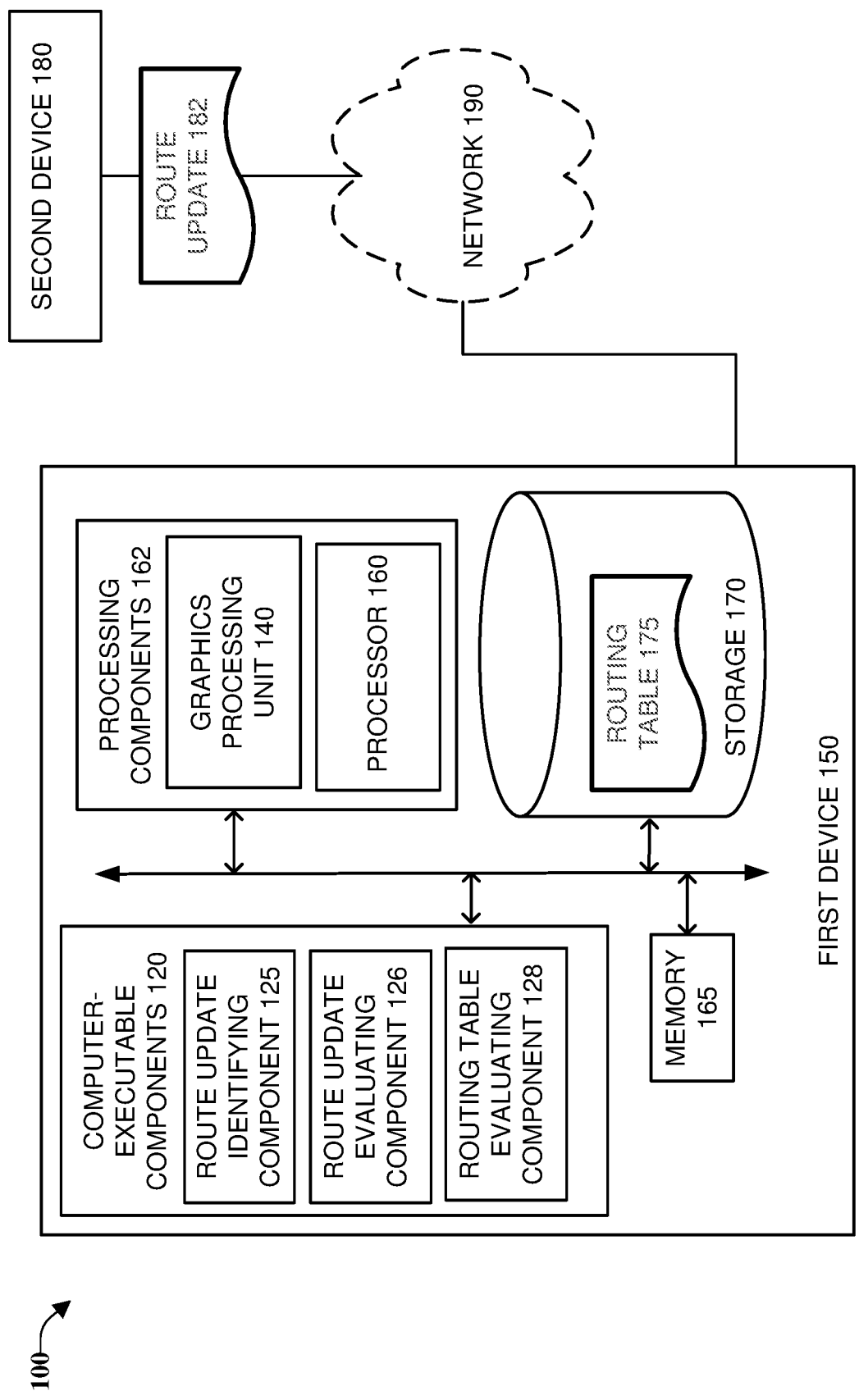
FIG. 1 is an architecture diagram of an example system that can facilitate selectively using a co-processor to process network routing information, in accordance with one or more embodiments.

Generally speaking, one or more embodiments can provide improved routing among multiple routing devices, in fifth generation (5G) or other next generation networks. In some implementations, one or more embodiments can facilitate establishing a relativistic routing approach that frequently identifies and distributes among routers, useful information about network conditions, e.g., to facilitate improved routing among multiple devices.

In addition, one or more embodiments described herein can be directed towards a multi-connectivity framework that supports the operation of New Radio (NR, sometimes referred to as fifth generation (5G)) As will be understood, one or more embodiments can allow an integration of user equipments (UEs) with network assistance, by supporting control and mobility functionality on cellular links (e.g. LTE or NR). One or more embodiments can provide benefits including, system robustness, reduced overhead, and global resource management, while facilitating direct communication links via a NR sidelink.

In some embodiments, the non-limiting term "radio network node" or simply "network node," "radio network device or simply "network device" are used herein. These terms may be used interchangeably, and refer to any type of network node that can serve user equipment and/or be connected to other network node or network element or any radio node from where user equipment receives signal. Examples of radio network nodes are Node B, base station (BS), multi-standard radio (MSR) node such as MSR BS, gNodeB, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS), etc. As noted above, some embodiments are described in particular for 5G new radio systems. The embodiments are however applicable to any radio access technology (RAT) or multi-RAT system where the user equipment operates using control signals, e.g. LTE FDD/TDD, WCMDA/HSPA, GSM/GERAN, Wi Fi, WLAN, WiMax, CDMA2000, etc.

In some embodiments, the non-limiting term router, routing device, or router device is used. This term can refer to any type of electronic device that can facilitate the connection of one or more nodes to a network, and between two or more nodes in the network, e.g., including, but not limited to, a general computer that has been configured to perform network routing functions. It should further be noted that, one or more embodiments used in examples herein utilize routers that employ an approach to network connectivity that is based on minimizing delay of networked communications by employing large numbers of route updates throughout the network, e.g., minimizing delay in a network route by making available frequently updated information about the network routes (e.g., route information and route updates discussed below) for use in planning network routes, e.g., link transmission speed, and delays.

One approach to implementing embodiments of this delay-minimizing approach that can use frequently generated route updates shared between routers. As described below, in one or more embodiments, routers can receive the route updates, rapidly process the route updates, using the processed route updates to direct or redirect network traffic to routes that can reduce delays. In addition, received route updates can be widely propagated to other networked devices. One aspect of this approach to routing is that it can utilize a router to process millions of route updates per second, with this level of route processing being improved by one or more of the embodiments described herein.

In one or more embodiments, as discussed further below, with route updates being rapidly and extensively propagated from router to router, the overhead of such an approach can be considered, along with increases in routing success that can be achieved by the approach. Further, notwithstanding the relationship between embodiments of this network routing approach and embodiments of frequent and extensive route updates used by routers described herein, some combinations of features described in one or more embodiments, and recited in the claims below, can be applied to other approaches to network routing beyond approaches described in one or more of the examples used herein.

In example approaches to routing that can beneficially employ one or more embodiments, routing devices can establish domains of authority where other networked routing devices can be affected by routing updates distributed by the routing devices. Because, in some implementations, routing updates can be rapidly propagated to other routing devices, useful results can be achieved by using one or more embodiments to limit this propagation of route updates.

It should be noted that, but facilitating the determination of whether to propagate route updates to individual routers, one or more embodiments can establish a system of distributed decision-making for routing devices of a network. Stated differently, in one or more embodiments, each router node can have a different area in which it has the best information (e.g., an authority domain), creating an area with a higher likelihood of optimization around each node. With this approach, networks can be composed of overlapping areas centered on the nodes. By frequently and extensively sharing routing information, together, the nodes can improve the likelihood of selecting the best path for a packet as it traverses the network in a distributed fashion. In some circumstances, because information exchanged between router can be delayed, the likelihood of optimization can improve the closer the packet gets to its destination.

FIG. 1 is an architecture diagram of an example system 100 that can facilitate selectively using a co-processor to process network routing information, in accordance with one or more embodiments. For purposes of brevity, description of some elements and/or processes of embodiments discussed further below are omitted in this discussion of FIG. 1. System 100 can include first device 150 connected via network 190 to second device 180. First device 150 can include computer-executable components 120, processor 160, graphics processing unit 140, storage 170, and memory 165. Computer-executable components 120 can include route update identifying component 125, route update evaluating component 126, routing table updating component 128, and other computer-executable components 120 that can be used to implement aspects of system 100, as described herein. Examples of computer executable components include applications 1032 and modules 1034 of FIG. 10 discussed below.

In some embodiments, memory 165 can comprise volatile memory (e.g., random access memory (RAM), static RAM (SRAM), dynamic RAM (DRAM), etc.) that can employ one or more memory architectures. Further examples of memory 165 are described below with reference to system memory 1006 of FIG. 10 discussed below. In some embodiments, storage 170 can comprise non-volatile memory (e.g., read only memory (ROM), programmable ROM (PROM), electrically programmable ROM (EPROM), electrically erasable programmable ROM (EEPROM), etc.) that can employ one or more storage architectures. Such examples of memory 165 and storage 170 can be employed to implement any embodiments of the subject disclosure described or suggested by disclosures herein.

According to multiple embodiments, processor 160 can comprise one or more processors and/or electronic circuitry that can implement one or more computer and/or machine readable, writable, and/or executable components and/or instructions that can be stored using memory 165 and storage 170. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more central processing unit, multi-core processor, microprocessor, dual microprocessors, microcontroller, System on a Chip (SOC), array processor, vector processor, and/or another type of processor. Further examples of processor 160 are described below with reference to processor 1002 of FIG. 10 below, and processing unit 1004 of FIG. 10 discussed below. Such examples of processor 160 can be employed to implement any embodiments of the subject disclosure.

It should be noted that, in the example of FIG. 1, and throughout this disclosure, graphics processing unit 140 is listed separately from processor 160, and this is because route updates 182 (as well as other routing information, such as routing table 175) can, in one or more embodiments, be advantageously generated, processed, and modified by different types of processors, e.g., specialized graphics processing units and other co-processing components. Different reasons why this is done by some implementations are discussed further below with FIGS. 2-5, e.g., because, as described further below, of the volume of route updates 182 that can be generated, processed and used by one or more embodiments to rapidly select network routes and change network routing. In this example, the graphics processing unit 140 can generate, process, and utilize the route updates (e.g., with extensive processing), while the processor 160 can use much less processing power to utilize the generated information, e.g., routing table 175 and route updates 182. As further discussed below, route update evaluating component 126 can provide a pre-processing assessment of route updates that can reduce the amount of processing that is performed by graphics processing unit 140.

Generally, applications (e.g., computer-executable components 120) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, handheld computing devices, microprocessor-based or programmable consumer electronics, and the like, each of which can be operatively coupled to one or more associated devices.

It should be appreciated that the embodiments of the subject disclosure depicted in various figures disclosed herein are for illustration only, and as such, the architecture of such embodiments are not limited to the systems, devices, and/or components depicted therein. For example, in some embodiments, first device 150 can further comprise various computer and/or computing-based elements described herein with reference to operating environment 1000 and FIG. 10. In one or more embodiments, such computer and/or computing-based elements can be used in connection with implementing one or more of the systems, devices, components, and/or computer-implemented operations shown and described in connection with FIG. 1 or other figures disclosed herein.

As described further below, in one or more embodiments, memory 165 can store executable instructions that, when executed by the processor can facilitate performance of operations that can implement one or more embodiments described herein. For example, in one or more embodiments, the operations can implement route update identifying component 125 that can facilitate receiving a route update for routing table 175 of first device 150 communicated via network 190 by second device 180, with the route update being associated with different aspects of network 190, e.g., a route to a network destination. Examples of routes and route updates are included with the discussion of FIG. 3-4 below. In alternative embodiments, operations can implement route update identifying component 125 that can facilitate identifying, by first device 150, a route update 182 by detecting, by the first routing device, route information corresponding to route update 182. It should be appreciated that route information that can be used by one or more embodiments is not limited examples described herein, but can be any information relevant to network 190 routing, at the current time and in the future.

In one or more embodiments, memory 165 can further store executable instructions that, when executed by the processor can facilitate performance of operations that can implement route update evaluating component 126. In one or more embodiments, route update evaluating component 126 can evaluate a value of route update 182, resulting in an evaluated value of the route update. Generally speaking, in one or more embodiments, the value of route update 182 can describe the usefulness of the route update for efficiently routing network traffic.

In one or more embodiments, memory 165 can further store executable instructions that, when executed by the processor can facilitate performance of operations that can implement route routing table updating component 128. In one or more embodiments, routing table updating component 128 can, as discussed further below, update an entry of routing table 175 based on route update 175 and the evaluated value of route update 182, e.g., by route update evaluating component 128.

In one or more embodiments, memory 165 can further store executable instructions that, when executed by the processor can facilitate performance of operations that can implement route routing table flooding component 129. In one or more embodiments, routing table flooding component 129 can, as discussed further below, selectively propagate route updates to other routing devices throughout network 190. Some embodiments can use a flooding protocol to distribute route updates because, as described further herein, with some exceptions, changes in routing information identified by routers (e.g., route updates) can be immediately propagated (e.g., using a flooding control protocol) to adjacent nodes, with these nodes in some cases discussed below, further flooding the updated information to adjacent nodes.

Figure 2:
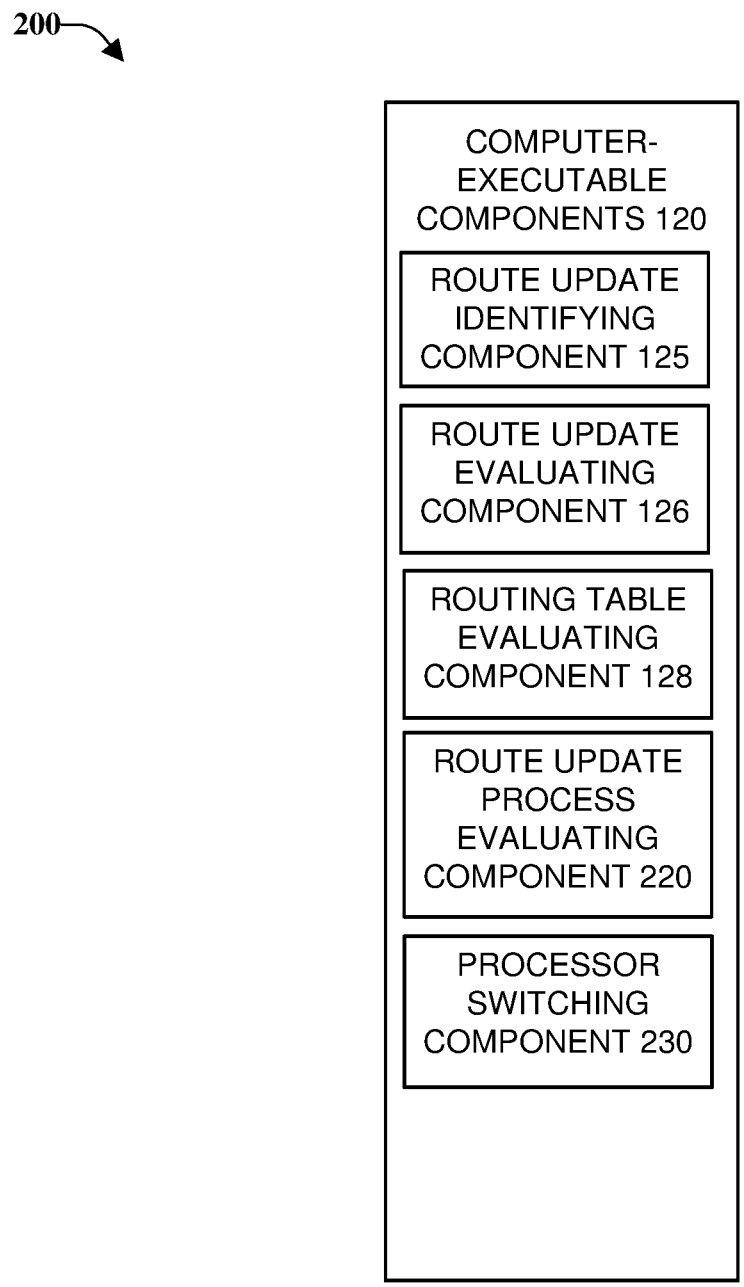
FIG. 2 depicts an example system that can facilitate selectively using a co-processor to process network routing information, in accordance with one or more embodiments.
Figure 3:
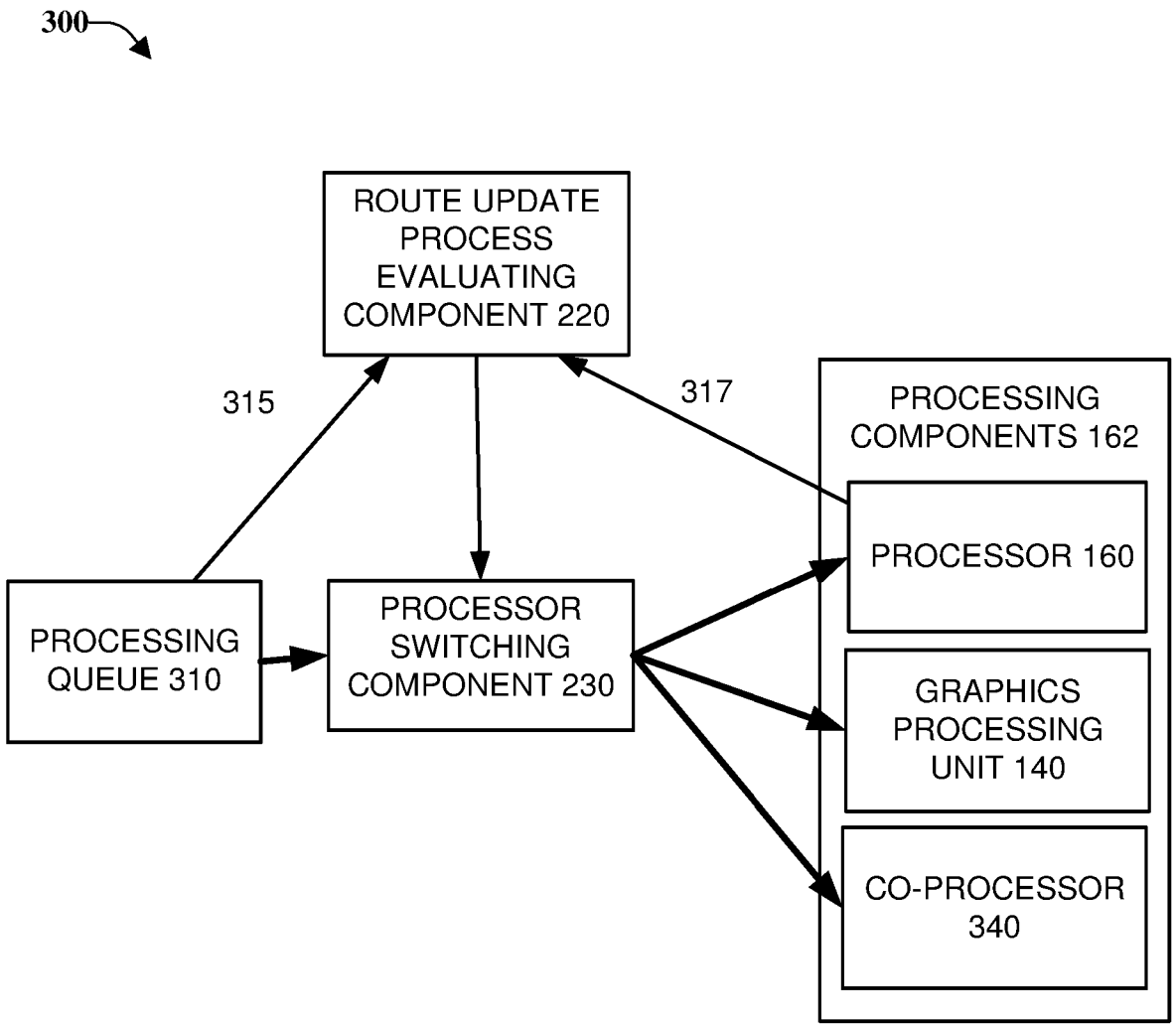
FIG. 3 depicts a system 300 for selectively using processing components to process network routing information based on monitoring the route update process, in accordance with one or more embodiments.

FIGS. 2-3 depict respective system 200 and 300 that can facilitate selectively using a co-processor to process network routing information, in accordance with one or more embodiments. For purposes of brevity, description of like elements and/or processes employed in other embodiments is omitted.

In FIG. 2 system 200 can include a routing device with computer-executable components 120 that can include route update identifying component 125, route update evaluating component 126, routing table updating component 128, route update process evaluating component 220, processor switching component 230, and other computer-executable components 120 that can be used to implement aspects of system 200, as described herein.

In one or more embodiments, memory 165 can further store executable instructions that, when executed by the processor can facilitate performance of operations that can implement route update process evaluating component 220. In one or more embodiments, route update process evaluating component 220 can measure of an aspect of the updating process and evaluate whether the measured aspect is equal to or above an updating process threshold for the aspect. In one or more embodiments, the measured aspect can comprise a combination of different aspects, including, but not limited to a measurement of a remaining processing capacity of the processor, and a measurement of a first number corresponding to delay of a processing queue.

In one or more embodiments, memory 165 can further store executable instructions that, when executed by the processor can facilitate performance of operations that can implement processor switching component 230. In one or more embodiments, processor switching component 230 can, when the aspect of the updating process is determined to be equal to or above a threshold, evaluating the value of the route update by employing the parallel processing capabilities of graphics processing unit 140. Alternatively, when the measurement of the aspect of the updating process is determined to be less than the threshold, processor switching component 230 can evaluate the value of the route update by employing processor 160. These concepts are described in further detail below, with a discussion of one or more embodiments switching between processor 160, graphics processing unit 140, and co-processor 145 of processing components 162.

FIG. 3 depicts a system 300 for selectively using processing components 162 to process network routing information based on monitoring the route update process, in accordance with one or more embodiments. For purposes of brevity, description of like elements and/or processes employed in other embodiments is omitted.

System 300 is depicted as including processing components 162, route update process evaluating component 220, processing queue 310, and processor switching component. Processing components 162 includes processor 160, graphics processing unit 140, and co-processor 340. As depicted, arrows define a processing path from processing queue 310, through processor switching component 230, to each of processor 160, graphics processing unit 140, and co-processor 340. In one or more embodiments, executable instructions can be executed by the processor that facilitate performance of operations including receiving a route update that can describe some aspect of network 190.

One or more embodiments can process received route updates, analyze the updates, and determine whether the information about the routes of network 190 represents a more accurate representation of actual network conditions than information currently available for operations of the routing device, e.g., selecting a next destination router for received communications according to a route to a destination of the communication. When the route update information is selected for storage, it can be store in routing table 175. In addition to the processing of new routing information, one having skill in the relevant art(s), given the description herein, would appreciate other processing tasks including, but not limited to, analyzing available information to select the next destination router for received communications according to a route to a destination of the communication. As described with respect to some embodiments, different processing tasks that can be performed by processing components 162 can be characterized as updating processes, e.g., the evaluating the value of route updates and the updating entries of routing table 175.

In accordance with the processing above, in one or more embodiments, executable instructions can be executed by the processor that facilitate performance of operations that can include evaluating a value of the route update, resulting in an evaluated value of the route update, e.g., by route update evaluating component 126. Further, in one or more embodiments, executable instructions can be executed by the processor that facilitate performance of operations that can include updating, by the graphics processing unit, a first entry of routing table 175 based on the route update and the evaluated value of the route update, e.g., by routing table evaluating component.

As noted above, an example larger system within which one or more embodiments described herein can be advantageously used is a system where extensive and frequent updating of locally stored routing information (e.g., routing table 175) can be used to reduce network 190 delays. One having skill in the relevant art(s), given the description herein would appreciate that systems with less frequent or extensive updating (e.g., updates sent out every 30 seconds) can be handled without use of many of the approaches described herein, e.g., because extensive processing resources are not required for infrequent updates.

Generally speaking, one or more embodiments can facilitate the selecting of one or more of processing components 162 based on the extensiveness and frequency of route information processing, as described throughout this disclosure. For example, in some circumstances, with large amounts of route updates to process, graphics processing unit 140, with a capacity for parallel processing of large amounts of calculations, can facilitate the speed and accuracy required by some implementations. In other circumstances, processor 160 can be selected because processing loads may not require the overhead of additional processing power.

Different approaches can be used by different embodiments of route update process evaluating component 220, to measure aspects of the route updating process. For example, link 315 depicts a collection of information from processing queue 310 by route update process evaluating component 220. As depicted in FIG. 3, processing queue 310 can represent queues for processing different items, including, but not limited to, route updates, and received packets in need of routing. As described herein, queuing delays can represent a significant source of overall delays in network links, and one or more embodiments can select short interval (e.g., 250 µs) for queue delays before information to be processed (e.g., incoming packets, route updates) are rapidly relayed to other connected routers for queueing and processing. In some implementations, based on the short queueing delays utilized by some embodiments, route update process evaluating component can monitor processing queue 310 to facilitate the selection of a combination of one or more processing resources 162 that can beneficially reduce the queue delays of processing queue 310, e.g., to reduce a transfer of processing tasks to other routers by one or more embodiments.

In addition to queue delay, as provided by link 317, a measure of remaining processing capacity one or more of processing components 162 can also be a measurement used by route update process evaluating component 220 to facilitate changes to the combination of processing resources, if needed. Based on these examples and explanation, one having skill in the relevant art(s), given the description herein, would appreciate a variety of other aspects of route selection and processing that can be used by one or more embodiments to select combinations of processing components 162.

Figure 4:
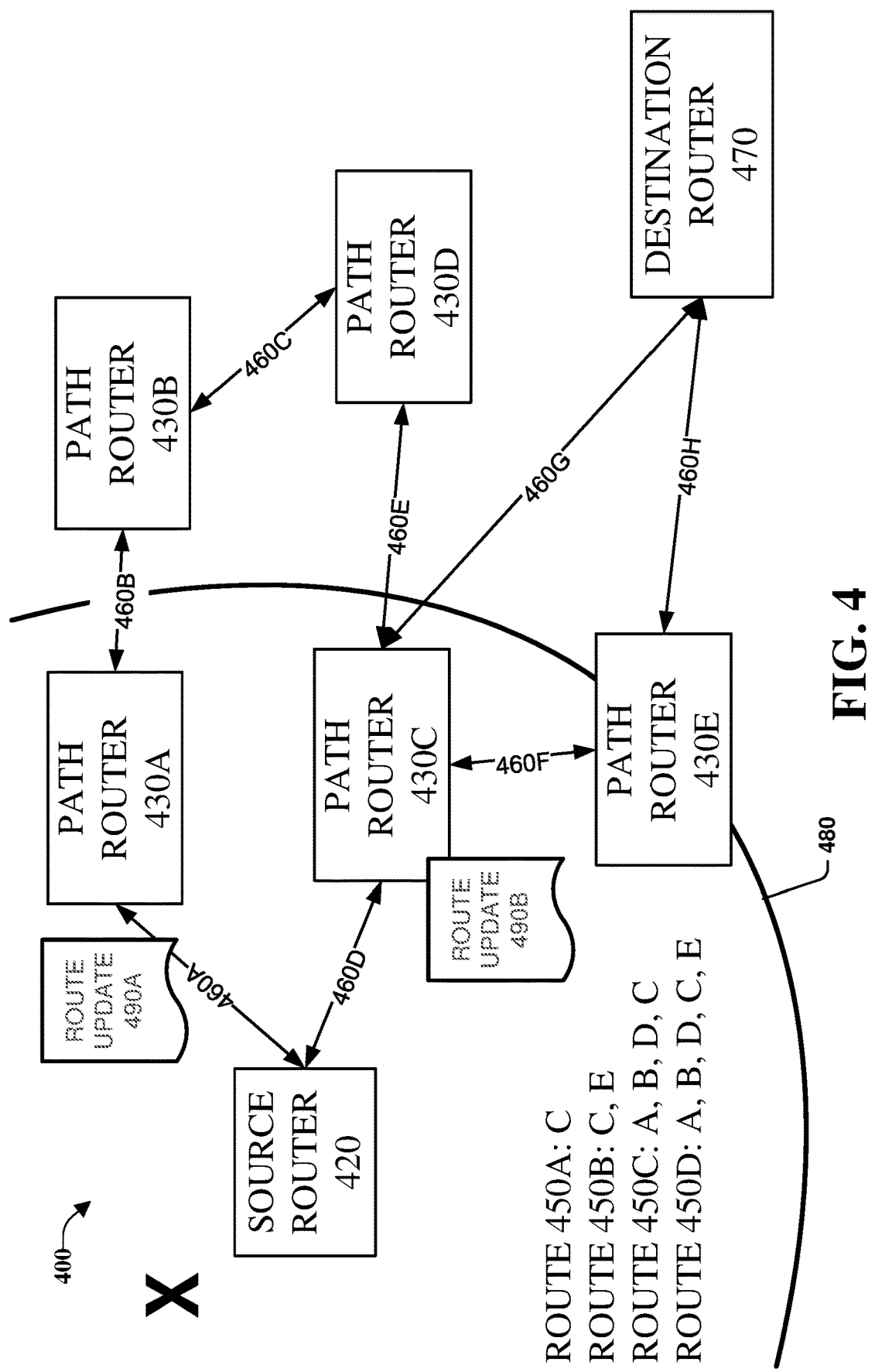
FIG. 4 depicts an example network where selective use of a co-processor can process network routing information based on monitoring a route update process, in accordance with one or more embodiments.

FIG. 4 depicts an example network 400 where selective use of a co-processor can process network routing information based on monitoring a route update process, in accordance with one or more embodiments. For purposes of brevity, description of like elements and/or processes employed in other embodiments is omitted. Network 400 includes source router 420, destination router 470, routers 430A-430E, and links 460A-H between variously depicted nodes. One having skill in the relevant art(s), given the description herein will appreciate that FIG. 4 depicts elements of an additional network routing example.

In this example, packets traveling from source router 430 to destination router 470 pass through ones of routers 430A-430E along a route. Source router 420, and path routers 430A, 430C, and 430E are in authority domain 480. Example routes 450A-450D are listed on FIG. 4, and include example routes from source router 420 to destination router 470. A route update 490 is depicted being forwarded from router 430A. One having skill in the relevant art(s), given the description herein will appreciate that FIG. 4 depicts elements that can be used to illustrate different approaches to routing traffic in network 400.

In one or more embodiments, routers as depicted (e.g., 420, 430A-E, and 470) can receive and send packets of information to connected routers in accordance with a selected path towards a destination router 470, e.g., TCP/IP routing. One having skill in the relevant art(s), given the description herein, would appreciate that one approach that can be used by routers to improve the selection, for packet relay, from available routers is the use of a routing table 175, local to each router 430A-E. This routing table 175 can collect known information about network links along different paths, and facilitate the selection of the next router. For example, if source router 420 has information in a routing table 175 that corresponds to a problem with link 460B, an algorithm that selects from routers 430A and 430C can select router 430C because this problem is avoided.

In one or more embodiments, different ways can be used to populate respective routing tables 175 of routers with information about network links. One way to determine this information is by pinging adjacent nodes to test the round trip speed of a data packet. This information when gathered can be compared to information already stored in the routing table 175 of the pinging router, and if the information is determined to be useful, it can be stored in the routing table for use by the pinging node.

In an example, source router 420 can ping both routers 430A and 430C, and store the results of these pings in a routing table 175 for use routing received packets, e.g., as a determined delay between source router 420 and each of routers 430A and 430C. In an example, as described with FIG. 2 above, based on an event (e.g., the identification of the noted delays) can trigger the propagation of this information in an asynchronous update to directly connected path routers 430A-C.

In this example, when route update 490A reaches path router, the TTL of the route update can be reduced by the travel time over link 460A. As described with FIG. 5 below, one approach for path router 430A to quickly evaluate the TTL of route update 490A is for source router 420, when it sends route update 490A to path router 430A, to estimate what the TTL will be upon receipt by path router 430A, and include this estimate in route update 490A. This estimate can be immediately used by path router 430A to determine the authority of the information of the route update (e.g., for updating it local routing table 175) and for determining whether to forward route update 490A to path router 430B. In the example depicted in FIG. 4, by the time route update 490A arrives at path router 430B from source router 420, the TTL can be negative, e.g., in this implementation, it has been counted down from the initial value, reached zero, then continued to count down into the negative.

It is important to note that, in one or more embodiments, exceeding the TTL of a route update can restrict the propagation of the route update, but not the use of the route update by the receiving path router 430A. For example, upon receipt of the route update 490, source router 420 can determine that this information should be stored in its local routing table 175 for use, e.g., by evaluating the value of the information (e.g., with lower delays evaluated as having higher value), discounted by the age of the information (e.g., by the time to live (TTL) value of the route update, as discussed herein). If determined as valuable and stored in routing table 175, in one or more embodiments, the information determined by source router 420, can be stored in routing table 175 of path router 430A. One having skill in the relevant art(s) will appreciate that other information can be stored in routing table 175 without departing from the spirit of embodiments described herein. Thus, it should further be appreciated that, in some embodiments, even though the negative authority value does not prevent the update of routing table 175, the low authority value that comes from the negative TTL value can cause the information to have less authority than the information of routing table 175.

In one or more embodiments, route information can be identified by source router 420 that can provide routing information about a route between source router 420 and destination router 470. In FIG. 4, three routes are identified, two of which utilize link 460E, between path router 430D and destination router 470. In this example, the routing information is that link 460E is temporarily unavailable for use. This information can be identified by source router 420 in a variety of ways, including, but not limited to, receiving it from another node (e.g., path router 430D can discover this information about an immediate link 460E) and relay this route update 490 via router 430A-E to source router 420. In another example, destination router 470 can detect the malfunctioning link 460E and send route update 490 to path router 430E, where this route update can be further forwarded to path router 430C and source router 420. Other ways this information can be identified by source router 420 include detection of this unavailable link 460E, by source router 420, during a periodic ping of the route to destination router 470.

Figure 5:
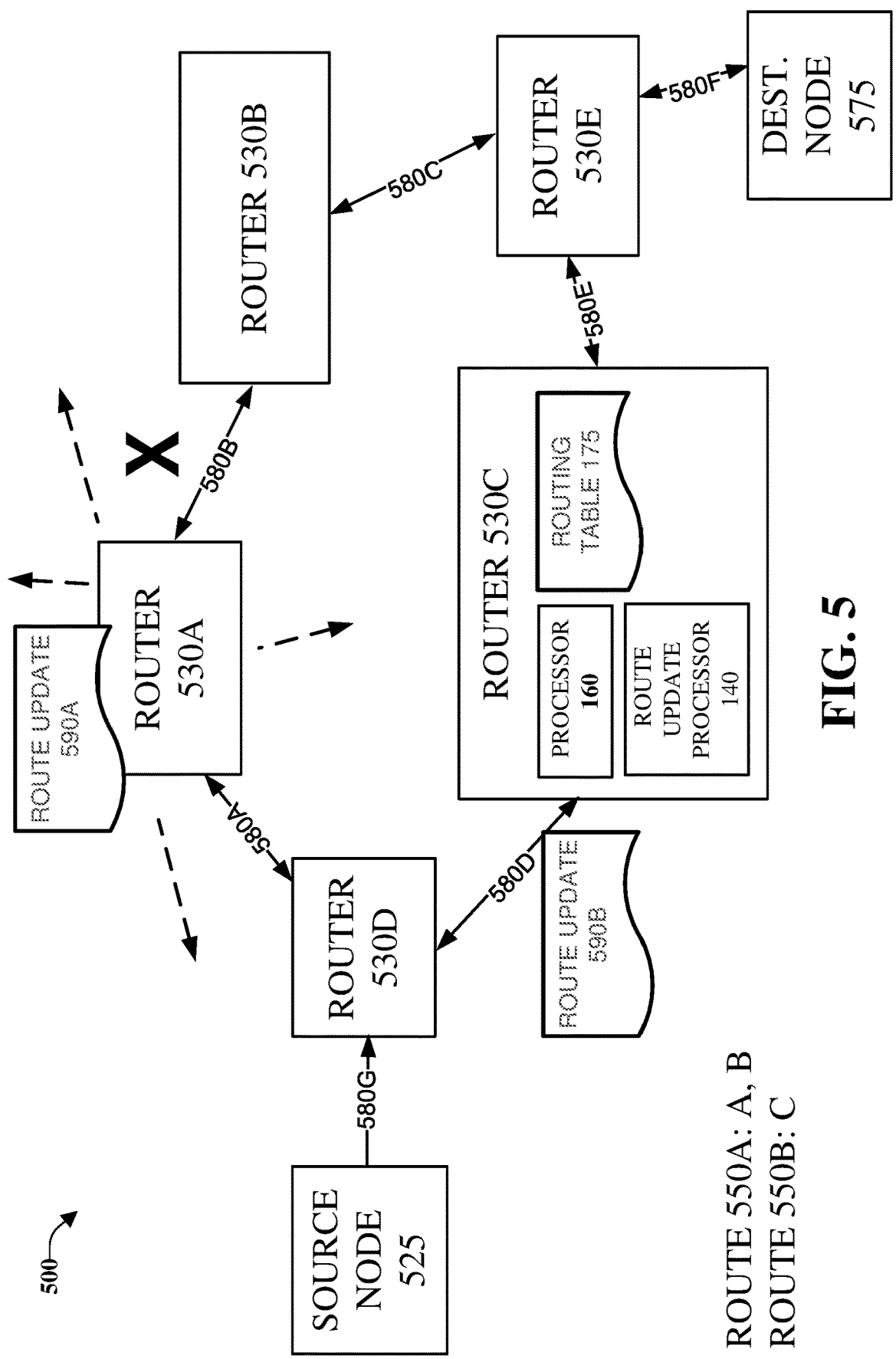
FIG. 5 illustrates another example node diagram of a network that can facilitate establishing a domain of authority for routing table updates from a routing device, in accordance with one or more embodiments.

FIG. 5 illustrates another example node diagram of a network 500 that can facilitate establishing a domain of authority for routing table updates from a routing device, in accordance with one or more embodiments. For purposes of brevity, description of like elements and/or processes employed in other embodiments is omitted.

Network 500 includes source router 530D, destination router 530E, routers 530A-530E, links 580A-G from source router 530D to destination router 530E, and inbound links 585A-E from destination router 530E to source router 530D. FIG. 5 can be used to illustrate different approaches that can be used by source router 530D to maintain routing table 175 and select between route 550A, from source router 530D to routers 530A-B, then to destination router 530E, and route 550B, from source router 530D to router 530C, then to destination router 530E, with destination router 530E being communicatively coupled to destination node 575.

As discussed above with network 400, in one or more embodiments, routers 530A-E can determine information about network route information, update a routing table, and share these updates with other nodes. It should be noted that, in example implementations, routing tables can be updated up to 500,000 times per second with current delay information determined from testing and from nearby nodes. As noted below, with some exceptions, any change in routing information identified by routers 530A-E are immediately propagated (e.g., using a flooding control protocol) to adjacent nodes, these nodes in some cases discussed below, further flooding the updated information to adjacent nodes.

In an example depicted in FIG. 5, router 530D, coupled to source node 525, can maintain routing table 175 based on information received by route update identifying component 125, from adjacent routers 530A and 530C about the operation of network 500. One having skill in the relevant art(s), given the description herein will appreciate other measures of network 500 operation, beyond the ones of this example, that can affect the maintenance of routing table 175.

As discussed further below, when considering the processing performed by graphics processing unit 140 by one or more embodiments, it should be noted that, like the rapid and extensive propagation of route update 590A by router 530A, generally speaking, upon receipt and after processing, source router 530D can be configured to send out route update 590A to all adjacent routers, e.g., router 530C.

In one or more embodiments, because of the extensive generation and propagation of route updates 590A by routers 530A-E, the frequency of route updates 590A-B received by routers 530A-E can cause route update processing loads that exceed the capacity of available processing resources. With respect to the example routing tables being updated up to 500,000 times per second with current delay information noted above, by some estimations, processing capability of over a $100 \times 10^{12}$ floating point operations per second (100 teraFLOPS) can be required, potentially exceeding the processing capacity of a Central Processing Unit (CPU). As noted above, one approach that can be employed by one or more embodiments is to have specialized processing resources dedicated to processing route updates 590A, e.g., one or more graphics processing units 140.

In one or more embodiments, additional approaches can be employed that can reduce the likelihood that the processing capacity routers will be exceeded by the processing of received route updates 590A. In an example system with frequent route updates being exchanged between routers, as well as frequent updates to routing tables 175, even with one or more dedicated and specialized graphics processing units 140, the route processing capacity of individual routers 530A-E can be insufficient to process and utilize the routing information available for use. In a further illustration of the route information processed by one or more embodiments, different processing tasks that can be performed by one or more embodiments are discussed further with FIG. 4 below. As discussed further below, one or more embodiments can reduce the route update processing load of routers 530A-E without reducing the quality of route data available for use for routing in routing table 175.

For example, to reduce the likelihood that processing capacity will be exceeded by the processing of received route updates 590A-B, one or more embodiments can employ features designed to reduce the number of route updates that are propagated from a router once received by the router. Thus, in some circumstances, route updates 590A-B are propagated to all adjacent nodes without analysis and with little restriction, and in other circumstances, this propagation is cut off, e.g., after the route update is too old to likely be useful.

One approach is to limit routing information propagated to adjacent routers based on different criteria. For example, network information identified by a router 530A-E can cause the generation and propagation of a route update 590A-B when a predicted utility of the routing information exceeds a threshold, e.g., a queuing delay at a node exceeds a value, or the bits per second of a network link 580A-G falls below a particular value. Other non-limiting, example approaches for predicting utility are discussed below, and with the discussion of FIG. 5.

As discussed further below, another way that the processing loads can be reduced for receiving routers 530A-E, is for the receiving nodes to perform as assessment of the route update upon receipt, before a more sophisticated level of processing is performed by graphics processing unit 140. In one or more embodiments, this assessment can be a rapid operation that can determine the quality of the route update information, e.g., the comparison of a one or more metrics that can indicate quality to a threshold.

In one or more embodiments, the countdown of the TTL value for route update 590A can be commenced and decremented is different ways. Returning to the example above, upon identification of the routing information, router 530A can note a time. When generating route update 590A, in this example, to further remove processing tasks from router 530D, router 530A can precalculate what the TTL will be at the time of receipt by router 530D. In one or more embodiments, this can be performed based on a measurement by router 530A of values that include, but are not limited to, the control transmission queue delay for router 530A (e.g., the route update may have to wait for transmission) and the transmission time across link 580A, e.g., this value being collected (e.g., via a ping of router 530D) and stored for use in routing table 175. One having skill in the relevant art(s), given the description herein, will appreciate that other approaches can be used to manage the TTL of route updates 590A-B, in accordance with one or more embodiments.

Considering one effect of TTL in the operation of embodiments, in some circumstances, assessed route information quality can incorporate a discount in the quality of the information based on the age of the information, e.g., as time passes after the identification of routing information, the accuracy of the identified information can decline as a description of particular network conditions at a particular link. In one or more embodiments, older information can still provide useful information, but the use of the information takes potential inaccuracies into account in different ways. As discussed further below, one approach to this, used by this example, assigns a time to live (TTL) value to route update information, e.g., the route update is only propagated to adjacent routers for a particular duration. By stopping propagation of route update 530A-B, the further spread of this information can be limited. Assigning this value also, in one or more embodiments, can have the effect of limiting the influence of a router in both time and space. For this example, a 250 μsec TTL is used, but one having skill in the relevant art(s), given the description herein, would appreciate that other TTL durations can be selected, with different results.

Further, in one or more embodiments, the authority of individual routers 530A-E can be limited in time because of the TTL applied to route information identified by respective routers, and limited in space based on physical limits, e.g., the speed of light can limit the propagation of any information to approximately 46 miles per 250 μsec TTL, and the propagation medium can slow this down further. For example, in some implementations, the maximum propagation speed for a route update is ⅔ the speed of light, e.g., approximately 31 miles in fiber-optic cable. Thus, in this example, with links 580D and 580E being implemented with fiber-optic cable, a route update 590B generated by router 530D would not reach router 530E if the distance of link 580D exceeds 31 miles, e.g., by the time route update 590B reaches router 530C, the 250 μp sec TTL for route update 590B has expired, and, while route update 590B can be utilized by router 530C, router 530C does not propagate route update 590B to router 530E.

As noted above, in one or more embodiments, TTL can be used to limit the propagation of route updates 590A-B, e.g., based on a geographical distance limit that comes from signal propagation. Further, as noted above, one or more embodiments can perform a quick assessment, e.g., comparing values of a route update to a threshold. In an example embodiments, these two concepts can be combined such that the only value considered with respect to the quality of the route update is the age of the update, e.g., as determined by the TTL at the time of receipt.

Additional examples of one or more embodiments limiting propagation of route updates are discussed below. Returning to the example discussed above, where router 530D receives route update 590A (e.g., with a round trip time of link 580B, determined by a ping of router 530B) from router 530A, upon receipt of route update 590A by router 530D, router 530D can either immediately forward the route update to all adjacent routers (e.g., including back to router 530A), or one or more embodiments can determine whether route update 590A satisfies one or more criteria for different potential destination routers, e.g., router 530A, and router 530C. For example, route update 590A can be generated based on a ping of router 530B by router 530A that measures the transmission speed of link 580B.

It should be noted that one condition that can be applied to forwarding route updates is that the route update have a TTL greater than zero, e.g., during the TTL of a route update, it is more likely to be an accurate representation of network conditions, and thus should be forwarded, and after expiration of the TTL, the information may still be useful to the receiving node, but should not necessarily be forwarded to other nodes.

In one or more embodiments, results of a ping can determine one element of the potential delay of a path. As described throughout this disclosure, the delay of a path (also termed "path delay") can used for routing determinations made by a router. Further, routers can exchange path delays for routes for which information is available to the router, and this communication can facilitate control data about links (e.g., route information) of network 500 being available to other routers in network 500. In one or more embodiments, when a router sends route information to another router, the sending router can add the delay of the link used for the sending, and thus can provide updated route information for entry into routing table 175.

In this example, route update 590A can include this measurement. Upon receipt, in one or more implementations, the TTL of route update 590A can be identified. In an example implementation, TTL can starts at a maximum value at the source of the route update, and the TTL can be decremented at each node by instantaneous delay to each directly attached router individually. For example, in one or more embodiments, TTL can be decremented differently for each link, taking into account factors that include, but are not limited to, control queue depth, serialization delay, propagation delay (from ping protocol), with main TTL and TTL values being included for reference in the routing table.

For example, route update evaluating component 126 determines a TTL of 250 μsec (e.g., starting TTL of 250 μsec TTL reduced by a 50 μsec instantaneous delay determined for link 580A). In this example, because route update 590A arrives at router 530D with a positive TTL, this update is accepted for processing by graphics processing unit 140. In one or more embodiments, TTL can be precalculated by the transmitting router because, in some embodiments, the transmitting router may be the only source of the example four elements of delay of the link for which route update 590A is distributed.

Continuing this example, during processing by graphics processing unit 140, a prior value is identified that describes the transmission speed of link 580B. In one or more embodiments, route update processing can then proceed to compare the quality of the new route information in route update 590A and the currently stored information. This quality can be measured in different ways, with one approach being based on the content of the update (e.g., a delay based on transmission speed of link 580B) discounted by the age of the information, e.g., based on the amount the TTL has been reduced from the starting value (e.g., a TTL of 250 μsec). This approach used by one or more embodiments can be based in part on a concept that a lower delay value for link 580D is of higher quality than a higher delay value for link 580D, without considering the age of the delay values. To incorporate the age of the delay value with this quality, one or more embodiments can use different mathematical formulas to discount the quality value by also considering the remaining TTL of the route update.

Thus, based on the forgoing embodiments, in some examples, if an entry in routing table 175 has a delay for link 580B as 20 μsec, but the information is 300 μsec old, and a route update 590B is received that measures the link delay at 10 μsec with a TTL of 200 μsec, then the older, stored value of 20 μsec can be replaced by the new route update 590A supplied value of 10 μsec. In other examples, route information stored in routing table 175 can have been determined more recently than the information in route update 590B, and this, combined with the delay information, can lead to the opposite result, e.g., the information of route update 590B being unused for the updating of routing table 175. It is worth noting however that, in some circumstances, because of the rapid forwarding of route update 590B, and the example TTL of 200 μsec being above zero, route update 590B can be forwarded to router 530C, even though it is not used by router 530D. One having skill in the relevant art(s), given the description herein, would appreciate that this approaches, along with the approaches used by many other example features described herein, can combine a goal of rapid propagation of network updates (e.g., leading to more accurate routing) with a potential for inaccurate results, e.g., based on accurate updates being unused based on the age of the information. Different parameters have been described herein that would enable the implementation and tuning of one or more embodiments to achieve the results desired.

An example of determining and utilizing authority is illustrated with some approaches described with FIGS. 4 and 5 above, and network 400 of FIG. 4. In this example, source router 420 can determine information corresponding to a delay between source router 420 and path router 430C, e.g., a delay of link 460D. In this example, route update 490A is generated and prepared to be transferred to all routers coupled to source router 420, e.g., including path router 430A. One way that some embodiments can increase the speed of processing at destination routers is to determine descriptive characteristics for the route updates before they are sent.

As described above with FIG. 5, TTL at the receiving router can be estimated based on the amount of time that has passed from original time of discovery of the routing information (e.g., 50 μs). In this example, based on a 250 μs maximum TTL, the TTL estimate attached to route update 490A is 200 μs, e.g., (250 μs-50 μs). In one or more embodiments, an estimated delay for a link that propagates the route update 490A can be combined with the determined age route update. For example, in one or more embodiments, a single value of route update delay can be stored for each destination network, and this value can be combined with a timestamp to calculate an instantaneous delay to use as described below to determine an authority of the route update. In this example, for delivery from source router 420 to path router 430A, routing table 175 of source router 420 has an instantaneous delay value of 30 μs for link 460A between source router 420 and path router 430A, and this can be used to estimate the delay from propagation of the route update.

Based at least on the age and delay described above, an authority value for route update 490A can be determined. In one or more embodiments, this authority value can be determined by source router 420 before the sending of route update 490A to router 430A. This determined authority value can be characterized as an authority value for route update 490A at the time that route update 490A is estimated to be received by the receiving router, e.g., path router 430A. In an example implementation using the example above, authority can have a maximum value (e.g., 1,000,000) that decreases based on the predicted age of the route update when it is received by the destination, e.g., 1,000,000/((Max TTL−Current TTL)+delay). Thus, in this example, using the 50 μs example from above, the base authority for route update 490A at the time it is prepared for transmission to path router 430A is 20000, e.g., 1,000,000/((250-200)+30). To estimate the authority value at the time of receipt by path router 430A, the 170 μs estimated TTL is used from the example above. Thus, at the time of receipt by path router 430A, the authority value for route update 490A is 12500, e.g., 1,000,000/((250 μs-170 μs)+30 μs). One having skill in the relevant art(s), given the description herein, would note the 37.5% reduction in authority based on the 30 µs transit time for link 460D. These estimates for authority and TTL at the time of receipt by path router 430A are included with route update 490A.

As noted above, upon receipt by path router 430A, route update 490A can be compared to an existing value corresponding to the information stored in routing table 175. In an example entry in routing table 175 of path router 430A, an entry for link 460D (e.g., a transmission time for travel to path router 430C), is 150 µs old at the time of receipt by path router 430A. In one or more embodiments, authority can be determined for this routing table 175 entry at the time route update 490A is received. Thus, in this example, the TTL for the routing table entry is 100 s, e.g., 250-150. Further, in this example, the authority value determined for the routing table entry is 10000, e.g., 1,000,000/((250-150)+0 delay). This 10000 can be compared to the 12500 authority value of route update 490A, and because the authority value of route update 490A exceeds the authority value of the routing table entry, the information of the route update replaces the routing table 175 information for link 460D. In this way, an authority value of a route update can be characterized as a priority of the route update compared to the priorities of other information. It should be noted that, in one or more embodiments, the authority of entries stored in a routing table can be instantaneously calculated value, e.g., not stored, but calculated at the time the eviction analysis described above occurs.

One having skill in the relevant art(s), given the description herein, would appreciate that the link 460D delay information can be used to update any entry in routing table 175 that is based on this link delay. For example, in routing table 175, for path router 430A, an entry for an estimated transmission time to path router 430E can be updated, because a route to this router travels by link 460D. The example approach described above for determining and utilizing authority values is non-limiting, and approaches and implementation specifics can be selected, e.g., the scale of the authority value and the rate at which the authority value is decreased over time.

Based on the foregoing, it would be apparent to one having skill in the relevant art(s), given the description there that, in some implementations, it is determined authority, not just a magnitude of delay, that can determine the utilization of routing information. Stated differently, it can be more advantageous to one or more embodiments to use an update that originated from a close-by source, even if it is not an improvement in delay, than to use an obsolete update from farther away that appears to indicate better conditions than the more recent update.

Figure 6:
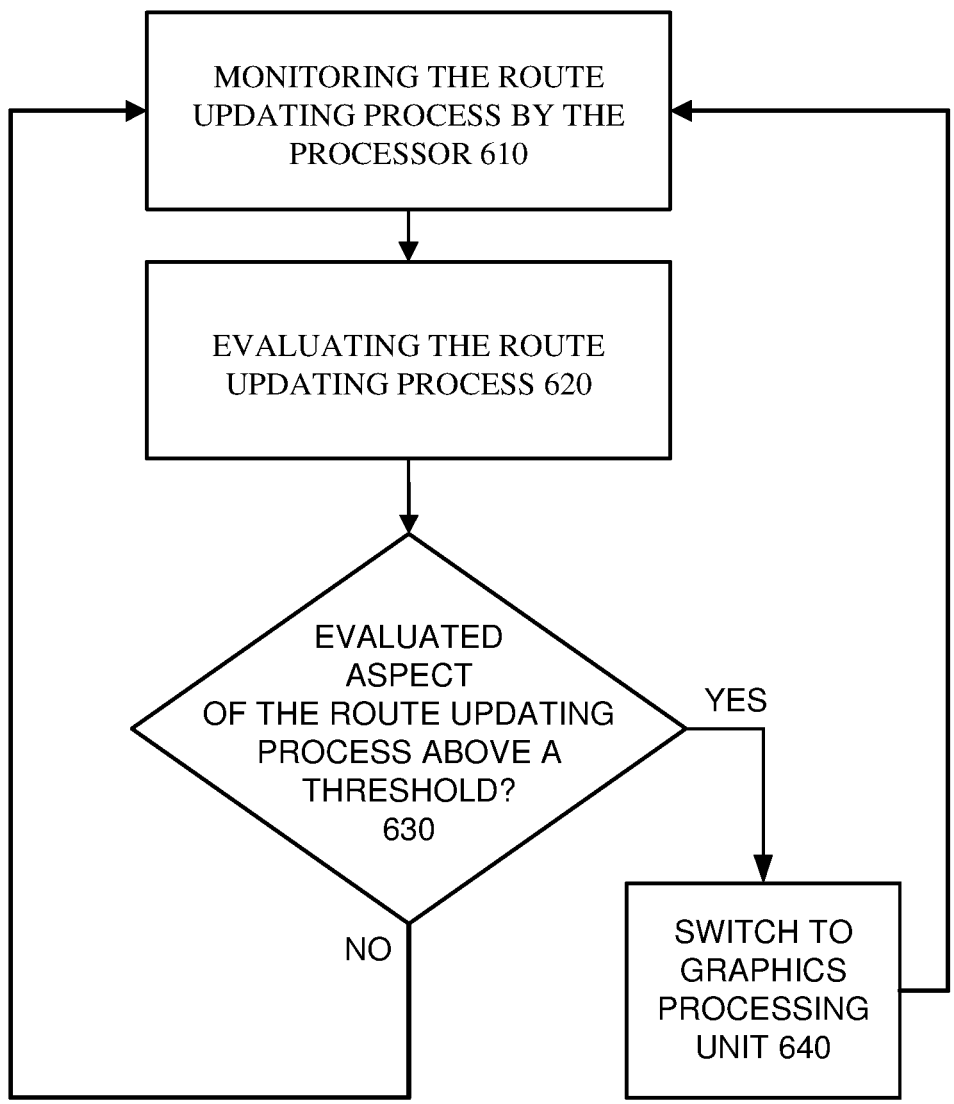
FIG. 6 depicts a process whereby the above described processes can facilitate selectively using a co-processor to process network routing information, in accordance with one or more embodiments.

FIG. 6 depicts a process whereby the above described processes can facilitate selectively using a co-processor to process network routing information, in accordance with one or more embodiments. For purposes of brevity, description of like elements and/or processes employed in other embodiments is omitted.

At 610, during processing of a route updates or packets by processor 160, a route updating process can be monitored by one or more embodiments. For example, in an embodiments, route update process evaluating component 220 can monitor the route updating process performed by one or more processing components 162. At 620, information from the monitored route updating process can be evaluated, and at 630, when the monitored aspect of the route updating process is above a threshold process flow moves to 640. At 640, processing can be switched (e.g., by processor switching component 230) from processor 160 to graphics processing unit 140 or co-processor 145. Alternatively, when the monitored aspect of the route updating process is below or equal to the threshold process flow loops back to 610 where the route updating process can be monitored by one or more embodiments.

Figure 7:
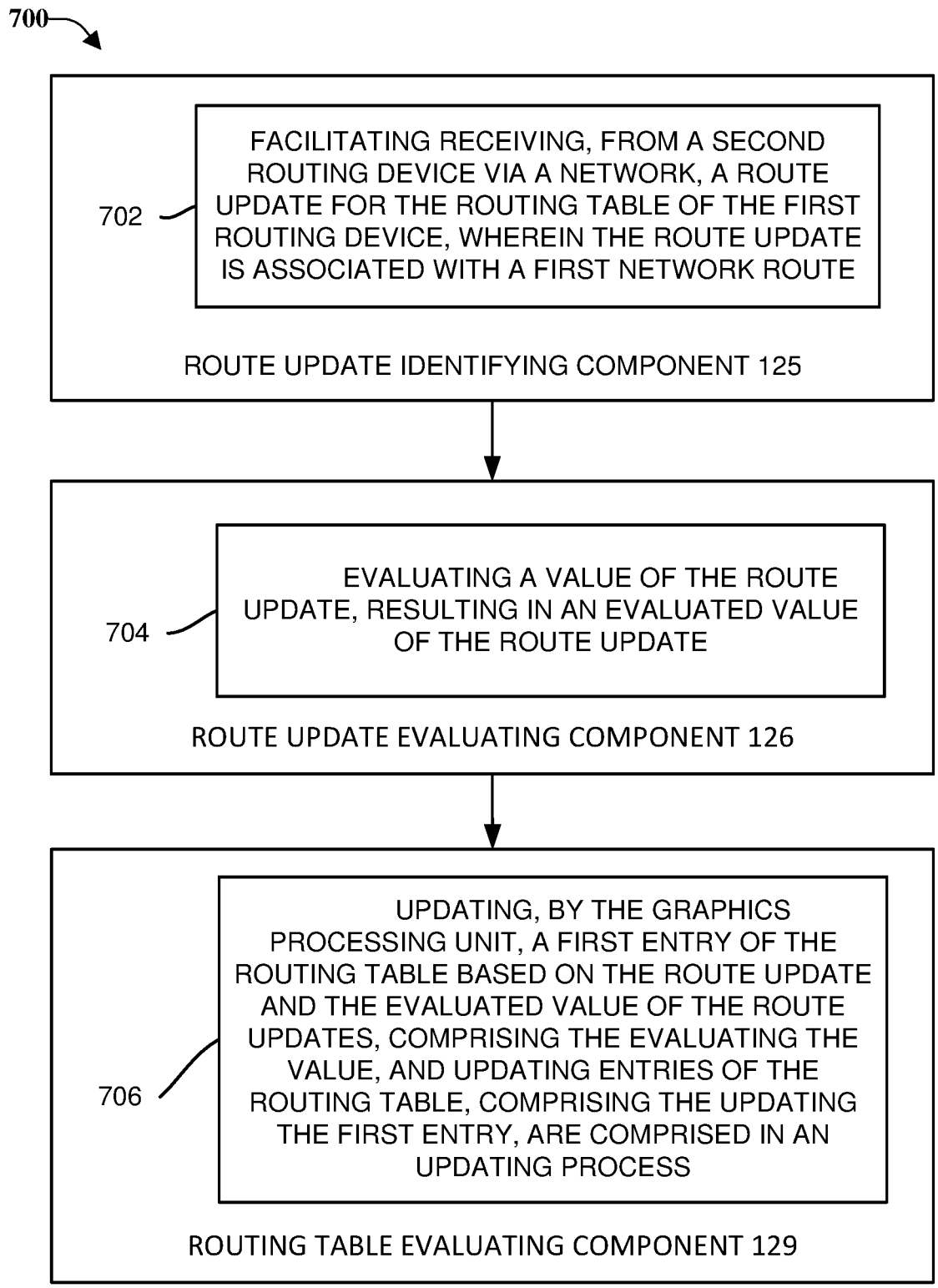
FIG. 7 is a flow diagram representing example operations of an example system 700 that can comprise a route update identifying component, route update evaluating component, and routing table evaluating component, that can facilitate selectively using a co-processor to process network routing information based on monitoring the route update process, in accordance with one or more embodiments.

FIG. 7 is a flow diagram representing example operations of an example system 700 that can comprise a route update identifying component 125, route update evaluating component 126, and routing table evaluating component 128, that can facilitate selectively using a co-processor to process network routing information based on monitoring the route update process, in accordance with one or more embodiments. For purposes of brevity, description of like elements and/or processes employed in other embodiments is omitted.

Route update identifying component 125 can be configured 702 to facilitate receiving, from a second routing device via a network, a route update for the routing table of the first routing device, wherein the route update is associated with a first network route. For example, in an embodiment, route update identifying component 125 can be configured to facilitate receiving, from a second routing device 180 via a network 190, a route update 182 for the routing table 175 of the first routing device 150, wherein the route update is associated with a first network route 450A.

Route update evaluating component 126 can be configured 704 to evaluate, by the graphics processing unit, a value of the route update, resulting in an evaluated value of the route update. For example, in an embodiment, route update evaluating component 126 can be configured to evaluate, by the graphics processing unit, a value of the route update, resulting in an evaluated value of the route update.

Routing table evaluating component 126 can be configured 704 to update, by the graphics processing unit, a first entry of the routing table based on the route update and the evaluated value of the route update, wherein evaluating the value of route updates, comprising the evaluating the value, and updating entries of the routing table, comprising the updating the first entry, are comprised in an updating process. For example, in an embodiment, routing table evaluating component 126 can be configured to update, by the graphics processing unit, a first entry of the routing table based on the route update and the evaluated value of the route update, wherein evaluating the value of route updates, comprising the evaluating the value, and updating entries of the routing table, comprising the updating the first entry, are comprised in an updating process.

Figure 8:
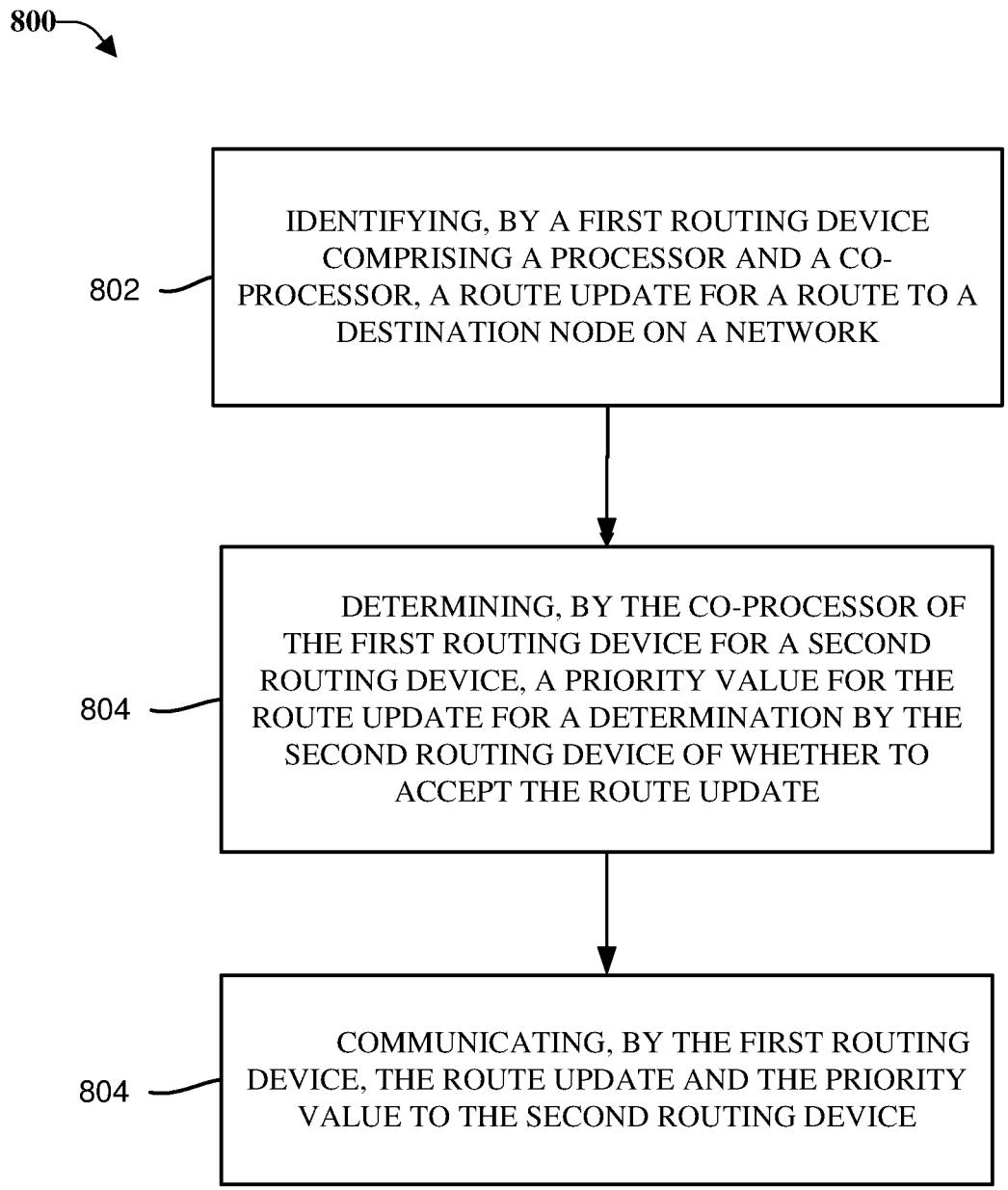
FIG. 8 illustrates a flow diagram of an example method that can facilitate selectively using a co-processor to process network routing information based on monitoring the route update process, in accordance with one or more embodiments.

FIG. 8 illustrates a flow diagram of an example method 700 that can facilitate selectively using a co-processor to process network routing information based on monitoring the route update process, in accordance with one or more embodiments. For purposes of brevity, description of like elements and/or processes employed in other embodiments is omitted.

At 802, method 800 can comprise identifying, by a first routing device comprising a processor and a co-processor, a route update for a route 450A to a destination node on a network. For example, in an embodiment, a method can comprise identifying, by a first routing device 150 comprising a processor 160 and a co-processor 145, a route update 182 for a route 450A to a destination router 470 on a network. At 804, method 800 can comprise determining, by the co-processor 145 of the first routing device 150 for a second routing device, a priority value for the route update for a determination by the second routing device of whether to accept the route update. For example, in an embodiment, a method can comprise determining, by the co-processor of the first routing device 150 for a second routing device 180, a priority value for the route update for a determination by the second routing device 180 of whether to accept the route update.

At 806, method 800 can comprise communicating, by the first routing device, the route update and the priority value to the second routing device. For example, in an embodiment, method 800 can comprise communicating, by the first routing device, the route update 182 and the priority value (e.g., authority) to the second routing device 180.

Figure 9:
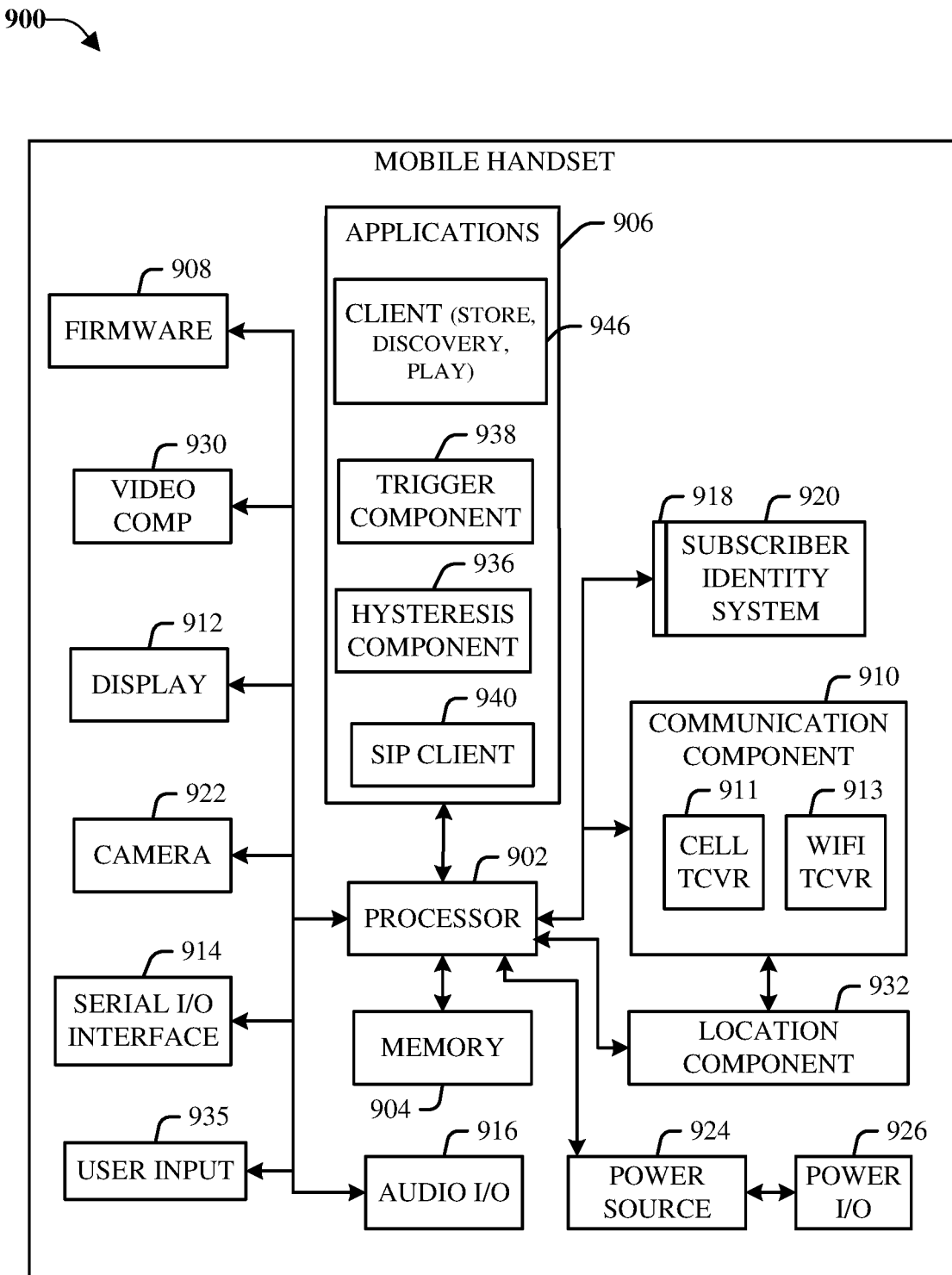
FIG. 9 illustrates an example block diagram of a mobile handset operable to engage in a system architecture that facilitates wireless communications according to one or more embodiments described herein.

FIG. 9 illustrates an example block diagram of a mobile handset 900 operable to engage in a system architecture that facilitates wireless communications according to one or more embodiments described herein. For purposes of brevity, description of like elements and/or processes employed in other embodiments is omitted. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the embodiments also can be implemented in combination with other program modules and/or as a combination of hardware and software.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1294) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or a decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

One or more devices described herein can be connected to one or more communication service provider networks via one or more backhaul links or the like (not shown). For example, the one or more backhaul links can comprise wired link components, such as a T1/E1 phone line, a digital subscriber line (DSL) (e.g., either synchronous or asynchronous), an asymmetric DSL (ADSL), an optical fiber backbone, a coaxial cable, and the like.

It should be understood that any of the examples and terms used herein are non-limiting. For instance, while examples are generally directed to non-standalone operation where the NR backhaul links are operating on mmWave bands and the control plane links are operating on sub-6 GHz LTE bands, it should be understood that it is straightforward to extend the technology described herein to scenarios in which the sub-6 GHz anchor carrier providing control plane functionality could also be based on NR. As such, any of the examples herein are non-limiting examples, any of the embodiments, aspects, concepts, structures, functionalities or examples described herein are non-limiting, and the technology may be used in various ways that provide benefits and advantages in radio communications in general.

One or more embodiments can employ various cellular systems, technologies, and modulation schemes to facilitate wireless radio communications between devices. While example embodiments include use of 5G new radio (NR) systems, one or more embodiments discussed herein can be applicable to any radio access technology (RAT) or multi-RAT system, including where user equipments operate using multiple carriers, e.g. LTE FDD/TDD, GSM/GERAN, CDMA2000, etc. For example, a wireless communication system can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the user equipment. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system 100 can be configured to provide and employ 5G wireless networking features and functionalities. With 5G networks that may use waveforms that split the bandwidth into several sub bands, different types of services can be accommodated in different sub bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Figure 10:
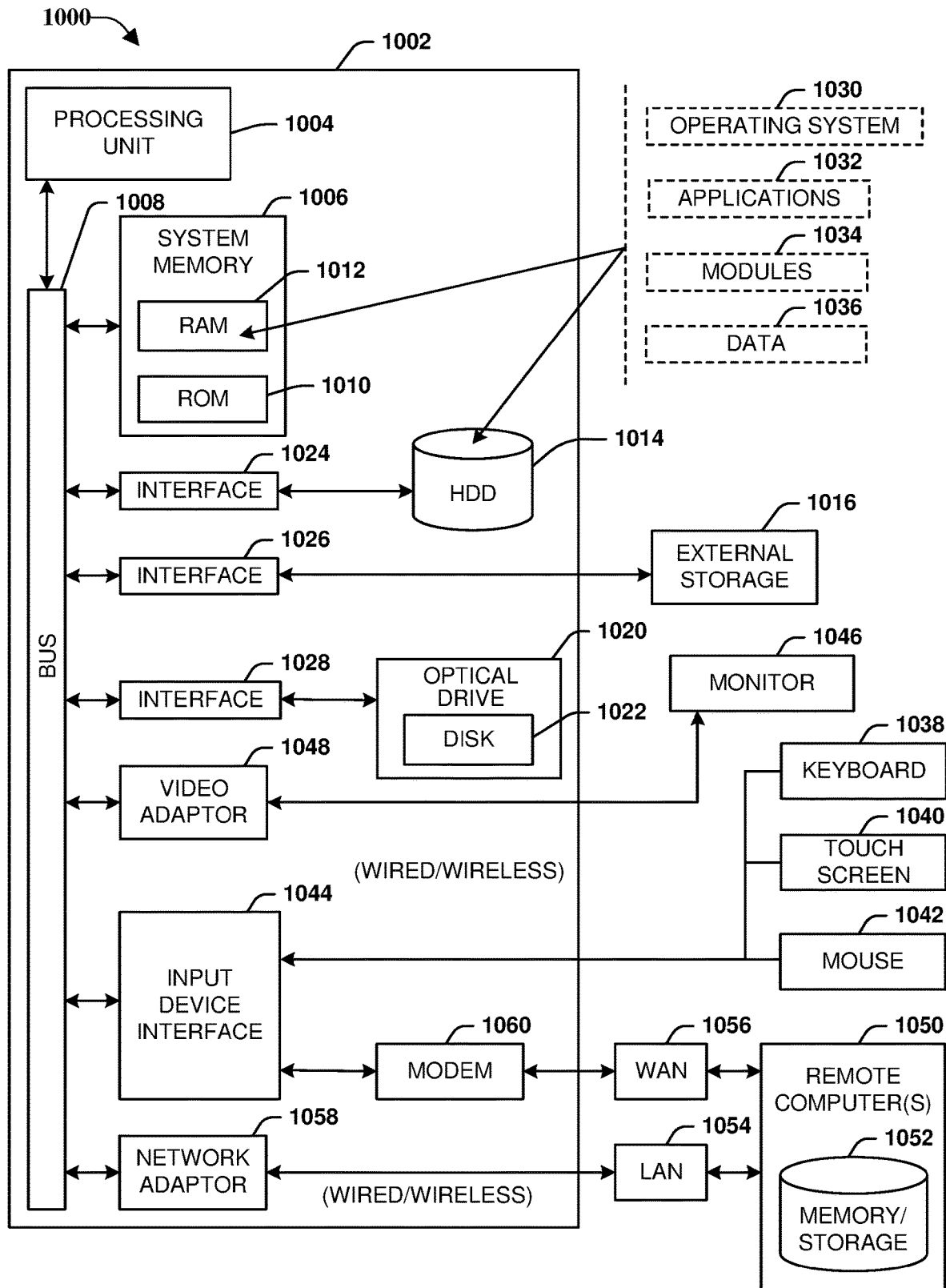
FIG. 10 illustrates an example block diagram of an example computer operable to engage in a system architecture that can facilitate processes described herein, in accordance with one or more embodiments.

Referring now to FIG. 10, in order to provide additional context for various embodiments described herein, FIG. 10 and the following discussion are intended to provide a brief, general description of a suitable computing environment 1000 in which the various embodiments of the embodiment, described herein can be implemented. While the embodiments have been described above in the general context of computer-executable instructions that can run on one or more computers, those skilled in the art will recognize that the embodiments can be also implemented in combination with other program modules and/or as a combination of hardware and software. For purposes of brevity, description of like elements and/or processes employed in other embodiments is omitted.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium. Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., WAN 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment, described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "network device," "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that can serve and receive data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipments do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the embodiments are not to be limited to any single implementation, but rather is to be construed in breadth, spirit and scope in accordance with the appended claims.

What is claimed is:

1. A first routing device, comprising:
a processor;
a graphics processing unit, wherein the processor and the graphics processing unit comprise different components; and
a memory that stores a routing table, and executable instructions that, when the executable instructions are executed by the processor, facilitate performance of operations, comprising:
facilitating receiving, from a second routing device via a network, a route update for the routing table of the first routing device, wherein the route update is associated with a first network route;
evaluating a value of the route update, resulting in an evaluated value of the route update; and
updating, by the graphics processing unit, a first entry of the routing table based on the route update and the evaluated value of the route update, wherein evaluating values of route updates, comprising the evaluating the value, and updating entries of the routing table, comprising the updating the first entry, are comprised in an updating process.

2. The first routing device of claim 1, wherein the evaluating the route update comprises, in response to a measurement of an aspect of the updating process being determined to be equal to or above a threshold, performing the evaluating of the value of the route update by the graphics processing unit, and
wherein the operations further comprise, in response to the measurement of the aspect of the updating process being determined to be less than the threshold, evaluating, by the processor, the value of the route update.

3. The first routing device of claim 2, wherein the measurement of the aspect of the updating process comprises the measurement of a remaining processing capacity of the processor.

4. The first routing device of claim 2, wherein the measurement of the aspect of the updating process comprises the measurement of a number corresponding to a delay of a processing queue.

5. The first routing device of claim 2, wherein the measurement of the aspect of the updating process comprises the measurement of a number corresponding to a frequency of reception of the route updates.

6. The first routing device of claim 1, wherein the updating the first entry of the routing table based on the route update and the evaluated value of the route update comprises,
in response to a measurement of an aspect of the updating process being determined to be equal to or above a threshold, performing the updating of the first entry of the routing table according to the route update and the evaluated value of the route update by the graphics processing unit, and
in response to the measurement of the aspect of the updating process being determined to be less than the threshold, updating, by the processor, the first entry of the routing table, according to the route update and the evaluated value of the route update.

7. The first routing device of claim 6, wherein the updating the first entry of the routing table in response to the measurement of the aspect of the updating process being determined to be equal to or above the threshold, comprises updating, in parallel, the first entry of the routing table and a second entry of the routing table.

8. The first routing device of claim 1, wherein the evaluating the value of the route update, resulting in the evaluated value of the route update comprises determining a first priority value of the route update.

9. The first routing device of claim 8, wherein the updating the first entry of the routing table comprises:

identifying a second network route of the first entry of the routing table as corresponding to the first network route of the route update;

comparing the first priority value of the route update to a second priority value of the first entry of the routing table; and in response to the first priority value being determined to be greater than the second priority value, replacing the first entry with the route update.

10. The first routing device of claim 9, wherein the operations further comprise:

in response to the identifying the second network route of the first entry as corresponding to the first network route of the route update, determining the second priority value of the first entry of the routing table.

11. The first routing device of claim 10, wherein the determining the second priority value of the first entry of the routing table comprises determining the second priority value based on an age of route information for the first network route in the first entry of the routing table.

12. A method, comprising:

identifying, by a first routing device comprising a processor and a co-processor, a route update for a route to a destination node on a network, wherein the co-processor comprises graphics processing co-processor, and a wherein the processor and the graphics processing co-processor comprise different components;

determining, by the co-processor of the first routing device for a second routing device, a priority value for the route update for a determination by the second routing device of whether to accept the route update; and communicating, by the first routing device, the route update and the priority value to the second routing device, wherein the determining the priority value is comprised in an updating process.

13. The method of claim 12, wherein the determining the priority value comprises, in response to a measurement of an aspect of the updating process being determined to be equal to or above a threshold, determining, by the co-processor, the priority value, and in response to the measurement of the aspect of the updating process being determined to be less than the threshold, determining, by the processor, the priority value.

14. The method of claim 13, wherein the measurement of the aspect of the updating process comprises the measurement of a remaining processing capacity of the processor.

15. The method of claim 12, wherein the determining the priority value of the route update comprises determining an estimated priority value of the route update at a time the route update is predicted to be received by the second routing device.

16. The method of claim 15, wherein the determining the estimated priority value of the route update at the time the route update is predicted to be received by the second routing device comprises determining the estimated priority value of the route update based on a link delay of a network link of the network between the first routing device and the second routing device.

17. The method of claim 12, wherein the determination by the second routing device of whether to accept the route update comprises the determination whether to update a routing table of the second routing device based on a comparison of the priority value of the route update to a second priority value of associated routing information in the routing table of the second routing device.

18. A non-transitory machine-readable medium comprising executable instructions that, when executed by a processor or a graphics processing unit of a first routing device, facilitate performance of operations, the operations comprising:

facilitating receiving, from a second routing device via a network, a route update for a first network route of the network and an authority value of the route update generated by the second routing device;

in response to a first measurement of a utilization of the processor being determined to be equal to or above a first threshold, updating, by the graphics processing unit of the first routing device, a routing table of the first routing device based on the route update and the authority value; and in response to a second measurement of the utilization of the processor being determined to be less than a second threshold, updating, by the processor, the routing table of the first routing device based on the route update and the authority value, wherein the processor and the graphics processing unit are different devices.

19. The non-transitory machine-readable medium of claim 18, wherein the updating, by the graphics processing unit, the routing table comprises, updating in parallel, by the graphics processing unit, different portions of the routing table.

20. The non-transitory machine-readable medium of claim 18, wherein the graphics processing unit of the first routing device is communicatively coupled to the routing table by a dual-ported connection that facilitates concurrent input from the routing table and output to the routing table, and wherein the updating, by the graphics processing unit, the routing table comprises, concurrently processing route updates via the dual-ported connection to the routing table.

* * * * *